(12) United States Patent
Kim (10) Patent No.: US 10,907,969 B2
(45) Date of Patent: Feb. 2, 2021

(54) INERTIA-BASED NAVIGATION APPARATUS AND INERTIA-BASED NAVIGATION METHOD BASED ON RELATIVE PREINTEGRATION

(71) Applicant: HANWHA DEFENSE CO., LTD., Changwon-si (KR)

(72) Inventor: Dong Shin Kim, Changwon-si (KR)

(73) Assignee: HANWHA DEFENSE CO.. LTD., Changwon-si (KR)

( * ) Notice: Subject to any disclaimer, the term of this patent is extended or adjusted under 35 U.S.C. 154(b) by 161 days.

(21) Appl. No.: 15/889,823

(22) Filed: Feb. 6, 2018

(65) Prior Publication Data

US 2019/0113347 A1 Apr. 18, 2019

(30) Foreign Application Priority Data

Oct. 12, 2017 (KR) .......................... 10-2017-0132748

(51) Int. Cl.
| | | |
|---|---|---|
| G01C 21/28 | (2006.01) | |
| G01C 21/00 | (2006.01) | |
| G05D 1/02 | (2020.01) | |
| G01S 5/00 | (2006.01) | |
| G06K 9/00 | (2006.01) | |

(Continued)

(52) U.S. Cl.
CPC ........... G01C 21/16 (2013.01); G01C 21/165 (2013.01)

(58) Field of Classification Search
None
See application file for complete search history.

(56) References Cited

U.S. PATENT DOCUMENTS

| 7,162,367 B2 * | 1/2007 | Lin ........................ G01C 21/28 342/357.57 |
| 8,165,795 B2 * | 4/2012 | Debailleul ............. G01C 25/00 244/195 |
| 8,374,783 B2 * | 2/2013 | Takac ................... A01B 79/005 340/988 |

(Continued)

FOREIGN PATENT DOCUMENTS

| KR | 10-2011-0114218 A | 10/2011 |
| KR | 10-1229958 B1 | 2/2013 |
| KR | 10-1311590 B1 | 9/2013 |

OTHER PUBLICATIONS

Eckenhoff, Kevin et. al, "High-Accuracy Preintegration for Visual-Inertial Navigation", 2016, Department of Mechanical Engineering, University of Delaware, 16 pages total.

(Continued)

Primary Examiner — Adam D Tissot
Assistant Examiner — Laura E Linhardt
(74) Attorney, Agent, or Firm — Sughrue Mion, PLLC (57) ABSTRACT

An inertia-based navigation apparatus and an inertia-based navigation method based on relative preintegration are provided. The inertia-based navigation apparatus includes: a first sensor detecting and outputting motion information about a moving body which is moving, based on a first coordinate system; a second sensor detecting and outputting inertia data about a translational acceleration and a rotational angular velocity related to the movement of the moving body, based on a second coordinate system; and a controller determining, at every first time, pose information about a position, a velocity and an attitude of the moving body in a reference coordinate system, based on the motion information and the inertia data.

18 Claims, 7 Drawing Sheets

(51) Int. Cl.
*G01C 22/00* (2006.01)
*G01C 21/16* (2006.01)

(56) References Cited

U.S. PATENT DOCUMENTS

| | | | | |
|---|---|---|---|---|
| 8,898,013 | B2* | 11/2014 | Napolitano | G01C 21/165 |
| | | | | 701/505 |
| 10,281,279 | B2* | 5/2019 | Ahmed | G01C 21/206 |
| 10,317,214 | B2* | 6/2019 | Fourie | G01C 22/00 |
| 2015/0331111 | A1* | 11/2015 | Newman | G01S 17/875 |
| | | | | 356/4.01 |
| 2018/0284802 | A1* | 10/2018 | Tsai | H04N 5/2353 |

OTHER PUBLICATIONS

Yang, Zhenfei et. al, "Monocular Visual—Inertial State Estimation With Online Initialization and Camera-IMU Extrinsic Calibration", Jan. 2017, IEEE Transactions on Automation Science and Engineering, vol. 14, No. 1, pp. 39-51.

Forster, Christian, et. al, "IMU Preintegration on Manifold for Efficient Visual-Inertial Maximum-a-Posteriori Estimation", Jul. 2015, Proceedings of Robotics: Science and Systems, 10 pages total.

Indelman, Vadim, et. al, "Information Fusion in Navigation Systems via Factor Graph Based Incremental Smoothing", Jan. 5, 2013, vol. 61, No. 8, 37 pages total.

Lupton, Todd, et. al, "Visual-Inertial-Aided Navigation for High-Dynamic Motion in Built Environments Without Initial Conditions", Feb. 2012, IEEE Transactions on Robotics, vol. 28, No. 1, pp. 61-76.

* cited by examiner

[REFERENCE COORDINATE SYSTEM]

INERTIA-BASED NAVIGATION APPARATUS AND INERTIA-BASED NAVIGATION METHOD BASED ON RELATIVE PREINTEGRATION

CROSS-REFERENCE TO THE RELATED APPLICATION

This application claims priority from Korean Patent Application No. 10-2017-0132748, filed on Oct. 12, 2017, in the Korean Intellectual Property Office, the disclosure of which is incorporated herein in its entirety by reference.

BACKGROUND

1. Field

Apparatuses and methods consistent with exemplary embodiments relate to an inertia-based navigation apparatus and an inertia-based navigation method based on relative preintegration.

2. Description of the Related Art

A navigation system, through an inertial measurement apparatus, determines a bearing using a gyroscope and calculates a movement displacement using an accelerometer. When an initial position is input, the inertial navigation system may always calculate and detect a position and a velocity of a moving body even when the moving body is moving. The inertial navigation system provides very accurate navigation performance for a short time without the influence of bad weather or jamming. However, since errors accumulate during integration of an acceleration and a velocity component in an acceleration, when the inertial navigation system is used for a long distance, navigation errors increase.

Specifically, the inertial navigation system may estimate a position of a moving body by using a microelectromechanical systems (MEMS)-based inertia system called an inertial measurement unit (IMU). The inertial navigation system detects position information about a moving body by using a preset navigation calculation algorithm. In this case, since the position information is obtained by a method of calculating a desired physical quantity by integrating inertia data (e.g. an acceleration, an angular velocity, etc.) obtained by the IMU, a drift phenomenon in which errors continuously accumulate with time occurs. Accordingly, accuracy of a whole system is reduced. Also, a navigation system according to the related art may determine that a motion (e.g. a pitch, roll, yaw, etc.) of a moving body changes or a front velocity exists due to vibration or noises, etc. of the moving body even when the moving body stops. This false determination may further increase errors of position information due to an accumulated drift phenomenon.

Additionally, the inertial measurement apparatus measures a value including gravity, and should transform values measured in a coordinate system of an inertia sensor into values in a coordinate system of the earth, which is a general reference coordinate system, in order to remove unnecessary gravity information. In this aspect, the inertial measurement apparatus requires a new initial condition every time to integrate values measured by the inertia sensor. In this case, an amount of operations remarkably increases and an operation speed of the inertial measurement apparatus remarkably decreases because a new initial condition is used every time for integration.

Recently, to address the above problems, an alternative of minimizing error accumulation of the inertia sensor by coupling another environment sensor detecting movement to the inertial navigation system, etc. and correcting a position is being studied. Also, to reduce an excessive integration process in the inertial measurement apparatus, a preintegration method is under development. Specifically, the preintegration method may calculate preintegration values, which are a position change amount, a velocity change amount and an attitude change amount of a moving body moving during a preset time period, by integrating, in advance, inertia data accumulated during the preset time period. Detailed descriptions thereof are provided in "Visual-Inertial-Aided Navigation for High-Dynamic Motion in Built Environments Without Initial Conditions" by "Todd Lupton and Salah Sukkarieh".

However, even when the preintegration method is applied, comparing pose information obtained by another sensor with pose information obtained by the inertial measurement apparatus requires coordinate transformation therebetween is required. The environment sensor and the inertial measurement apparatus calculate a pose of a moving body based on different coordinate systems, respectively. To compare the poses, a process of transforming a coordinate system of one of the sensors to a coordinate system of another, and then transforming the transformed coordinate system to an original coordinate system is required. This process requires many operation processes and much processing time in order to obtain the pose information about a moving body.

SUMMARY

One or more example embodiments provide an inertia-based navigation apparatus and an inertia-based navigation method based on relative preintegration, the apparatus including a first sensor detecting movement of a moving body and a second sensor measuring inertia data which is information about a rotational acceleration and a translational acceleration of the moving body, the method including calculating a preintegration value by preintegrating the inertia data of the second sensor, estimating a relative preintegration amount predicted to be calculated at a position of the first sensor by reflecting a relative dynamic portion, comparing second pose information, which is pose information of the moving body obtained by the second sensor, with first pose information, which is pose information of the moving body obtained by the first sensor without coordinate transformation, to swiftly and accurately remove an error of the second pose information.

Additional aspects of the example embodiments will be set forth in part in the description which follows and, in part, will be apparent from the description, or may be learned by practice of the presented embodiments.

According to one or more example embodiments, there is provided an inertia-based navigation apparatus which may include: a first sensor configured to detect and output motion information about a moving body which is moving, based on a first coordinate system; a second sensor configured to detect and output inertia data about a translational acceleration and a rotational angular velocity related to the movement of the moving body, based on a second coordinate system; and a controller configured to determine, at every first time, pose information about a position, a velocity and an attitude of the moving body in a reference coordinate system, based on the motion information and the inertia data, wherein the controller is further configured to: calculate first pose information about the moving body, based on the motion information; estimate relative preintegration amounts, which include a position change amount, a velocity change amount and an attitude change amount of the moving body predicted in the first coordinate system during the first time, by preintegrating the inertia data based on an external correction value which is a preset relation between the first coordinate system and the second coordinate system; calculate, based on the relative preintegration amounts and the external correction value, second pose information about the moving body corresponding to the inertia data; correct an error of the second pose information by comparing the first pose information with the second pose information; and determine the error-corrected second pose information as pose information about the moving body.

The controller may calculate preintegration amounts, which include a position change amount, a velocity change amount, and an attitude change amount in the second coordinate system, by determining a rotation degree of the moving body which is moving, based on a coordinate system of the moving body corresponding to a previously determined pose information about the moving body, and preintegrating the inertia data.

The controller may estimate the relative preintegration amounts predicted in the first coordinate system based on the preintegration amounts and a displacement difference between the first coordinate system and the second coordinate system.

The controller may calculate an angular acceleration and an angular velocity based on the inertia data, calculate a difference amount between the preintegration amount and a preintegration amount predicted in the first coordinate system based on the calculated angular acceleration, the calculated angular velocity, and the difference, and estimate the relative preintegration amounts based on the preintegration amounts and the difference amount.

The controller may calculate the second pose information by reflecting a rotational displacement difference between the first coordinate system and the second coordinate system.

The controller may estimate the relative preintegration amounts by incorporating a first variable which is a variable corresponding to a displacement difference between the first coordinate system and the second coordinate system, and calculate the second pose information by incorporating a second variable which is a variable corresponding to a rotational displacement difference between the first coordinate system and the second coordinate system.

The controller may set the external correction value by comparing the first pose information with the second pose information, and determining values of the first variable and the second variable.

The controller may calculate the second pose information reflecting the determined values of the first and second variables.

The first sensor may detect movement of the moving body by using at least one of a camera and a lidar.

According to one or more example embodiments, there is provided an inertia-based navigation method based on relative preintegration. The method may include: obtaining motion information from a first sensor detecting movement of a moving body based on a first coordinate system; obtaining inertia data from a second sensor detecting a translational acceleration and a rotational angular velocity which are measured according to the movement of the moving body based on a second coordinate system; and determining, at every first time, pose information about a position, a velocity and an attitude of the moving body in a reference coordinate system, based on the motion information and the inertia data, wherein the determining the pose information comprises: calculating first pose information about the moving body, based on the motion information; estimating relative preintegration amounts, which include a position change amount, a velocity change amount and an attitude change amount of the moving body predicted in the first coordinate system during the first time, by preintegrating the inertia data based on an external correction value which is a relation between the first coordinate system and the second coordinate system; calculating, based on the estimated relative preintegration amounts and the external correction value, second pose information about the moving body corresponding to the inertia data; correcting an error of the second pose information by comparing the first pose information with the second pose information; and determining the error-corrected second pose information as pose information about the moving body.

The estimating the relative preintegration amounts may include: determining a rotation degree of the moving body based on a coordinate system of the moving body corresponding to previously determined pose information about the moving body, and estimating preintegration amounts, which include a position change amount, a velocity change amount, and an attitude change amount in the second coordinate system, based on the determined rotation degree.

The estimating the relative preintegration amounts may include: estimating the relative preintegration amounts predicted in the first coordinate system by reflecting a displacement difference between the first coordinate system and the second coordinate system.

The estimating the relative preintegration amounts may include: calculating an angular acceleration and an angular velocity, based on the inertia data; calculating a difference amount between the preintegration amounts and the a preintegration amounts predicted in the first coordinate system based on the calculated angular acceleration, the calculated angular velocity, and the difference; and estimating the relative preintegration amounts based on the preintegration amounts and the difference amount.

The method may further include calculating the second pose information by reflecting a rotation displacement difference between the first coordinate system and the second coordinate system.

The estimating the relative preintegration amounts may include estimating the relative preintegration amounts by incorporating a first variable which is a variable corresponding to a displacement difference between the first coordinate system and the second coordinate system. The calculating the second pose information may include calculating the second pose information by incorporating a second variable which is a variable corresponding to a rotational displacement difference between the first coordinate system and the second coordinate system.

The method may further include determining values of the first and second variables by comparing the first pose information with the second pose information, thereby setting the external correction value.

The calculating the second pose information may further include calculating the second pose information reflecting the determined values of the first and second variables.

Here, in a case where external correction values which are differences in a displacement and a rotational displacement of a coordinate between the first sensor and the second sensor are not set in advance, the apparatus and the method may estimate the second pose information including a first variable, which is a variable corresponding to the displacement, and a second variable, which is a variable corresponding to the rotational displacement, and accurately determine the external correction values for the displacement and the rotational displacement by inputting the first pose information into the second pose information.

BRIEF DESCRIPTION OF THE DRAWINGS

These and/or other aspects of the inventive concept will become apparent and more readily appreciated from the following description of the example embodiments, taken in conjunction with the accompanying drawings in which.

DETAILED DESCRIPTION

As the inventive concept allows for various changes and numerous embodiments, example embodiments will be illustrated in the drawings and described in detail in the written description. An effect and a characteristic of the inventive concept, and a method of accomplishing these will be apparent when referring to example embodiments described with reference to the drawings. This disclosure may, however, be embodied in many different forms and should not be construed as limited to the example embodiments set forth herein.

Hereinafter, the inventive concept will be described more fully with reference to the accompanying drawings, in which example embodiments thereof are shown. When description is made with reference to the drawings, like reference numerals in the drawings denote like or corresponding elements, and repeated description thereof will be omitted.

It will be understood that although the terms "first", "second", etc. may be used herein to describe various components, these components should not be limited by these terms. These components are only used to distinguish one component from another.

As used herein, the singular forms "a," "an", and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto.

Figure 1:
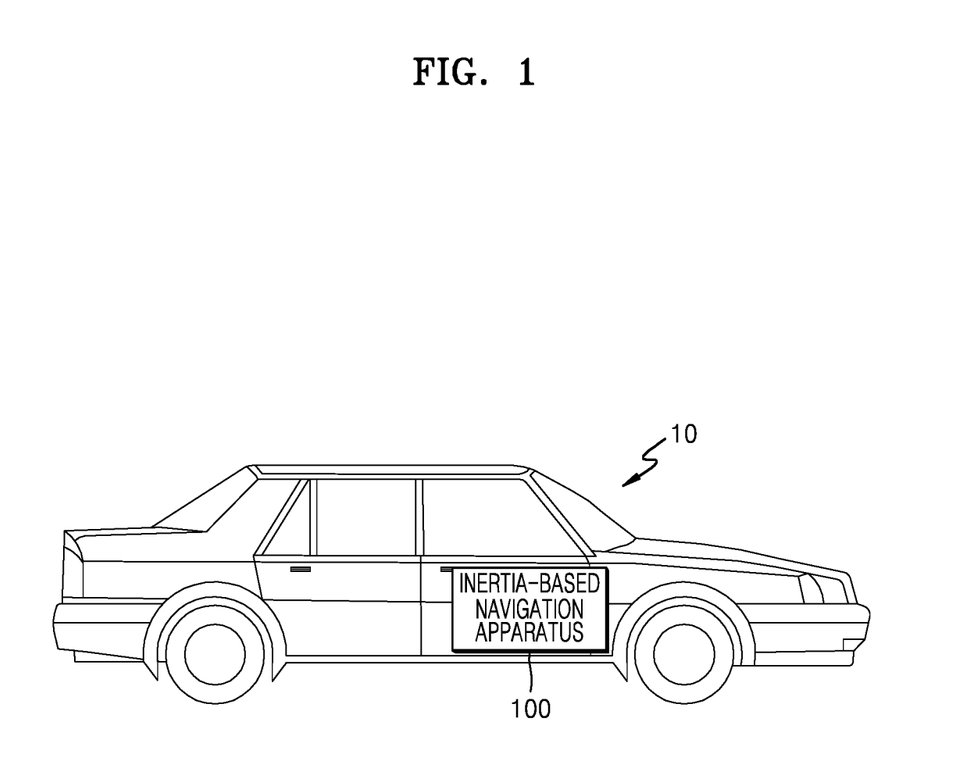
FIG. 1 is a view of a moving body including an inertia-based navigation apparatus, according to an example embodiment.

FIG. 1 is a view of a moving body including an inertia-based navigation apparatus, according to an example embodiment.

Referring to FIG. 1, the moving body 10 includes an inertia-based navigation apparatus 100, and may obtain pose information about a position, a velocity and an attitude about the moving body 10 through the inertia-based navigation apparatus 100. Here, the pose information about a position, a velocity and an attitude is pose information based on a reference coordinate system.

The moving body 10 includes at least one rigid body, and may move by using an internal combustion engine such as an engine. The moving body 10 may move variously along various paths. Meanwhile, though the moving body 10 is illustrated as an automobile in FIG. 1, application of the inventive concept is not limited thereto, and may extend to all objects having movement such as a train, a motorcycle, an electric bicycle, or a human being, an animal, etc.

The inertia-based navigation apparatus 100 may include at least two or more sensors which may detect movement of the moving body 10. The inertia-based navigation apparatus 100 may determine pose information about a position, a velocity and an attitude of the moving body 10 based on movement information obtained by the two sensors. The inertia-based navigation apparatus 100 may include an inertia sensor which may detect values of inertia such as an acceleration, an angular acceleration, etc. of the moving body 10. The inertia sensor may provide values about inertia expressed in a preset coordinate system including three axes of x, y and z. The preset coordinate system may have a preset rotation displacement with respect to a reference coordinate system, which is a coordinate system of the earth, depending on a pose of the moving body 10. The inertia-based navigation apparatus 100 may determine pose information about the moving body 10 depending on movement by combining inertia data, which are values of inertia obtained by the inertia sensor and motion information obtained from a sensor different from the inertia sensor.

Meanwhile, the pose information about a position, a velocity and an attitude of the moving body 10 is pose information based on a reference coordinate system. Meanwhile, a coordinate system used for informing a position of the moving body 10 in inertial navigation such as an earth coordinate system like a global positioning system (GPS), that is, a globally referenced navigation frame may be set as the reference coordinate system.

According to an example embodiment, the inertia-based navigation apparatus 100 may include at least two or sensors, and the at least two sensors may detect movement of the moving body 10 through different coordinate systems, respectively. The inertia-based navigation apparatus 100 may obtain inertia data, which are values of inertia obtained by the inertia sensor, and obtain motion information, which is information about movement of the moving body 10 from the other sensors. The inertia-based navigation apparatus 100 may estimate movement change amounts (e.g. a position change amount, a velocity change amount and an attitude change amount) predicted in a coordinate system of the other sensors based on the inertia data, and calculate pose information about the moving body 10 predicted based on the coordinate system of the other sensors based on the estimated movement change amounts. The inertia-based navigation apparatus 100 may compare the pose information about the moving body 10 obtained through the inertia data with the pose information about the moving body 10 calculated through the other sensors, and correct an error therebetween. The inertia-based navigation apparatus 100 may remove an error between the sensors or minimize error accumulation. That is, the inertia-based navigation apparatus 100 may correct an error due to noises and bias of the inertia sensor through motion information about the other sensors.

Figure 2A:
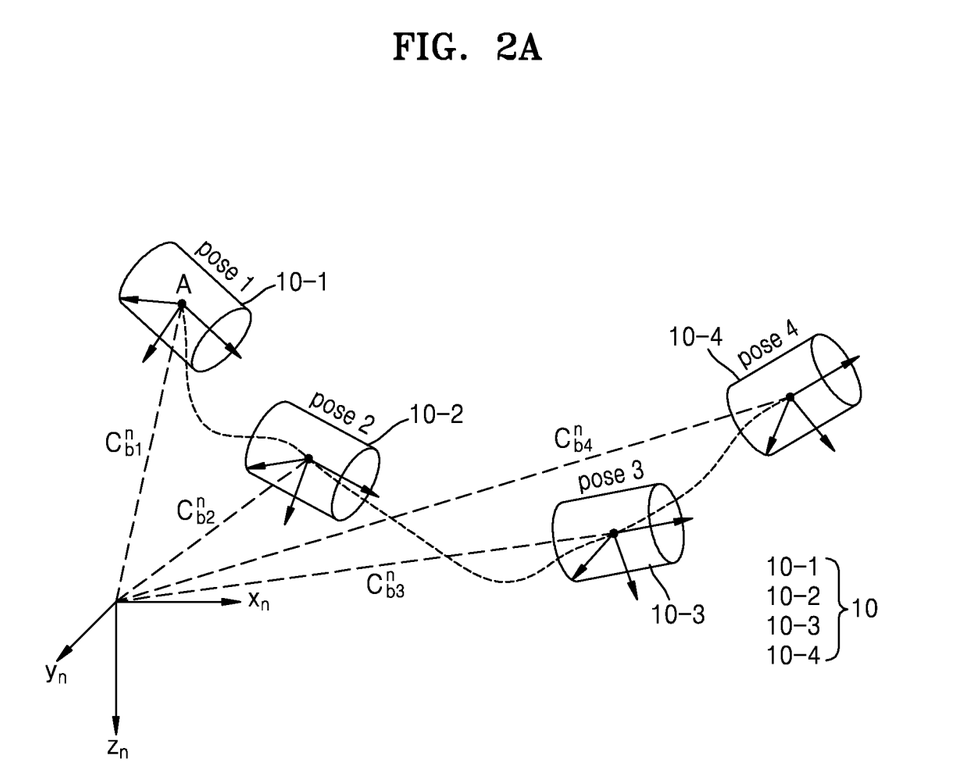
FIGS. 2A and 2B are views for explaining a preintegration method according to a change in pose information of a moving body, according to example embodiments.
Figure 2B:
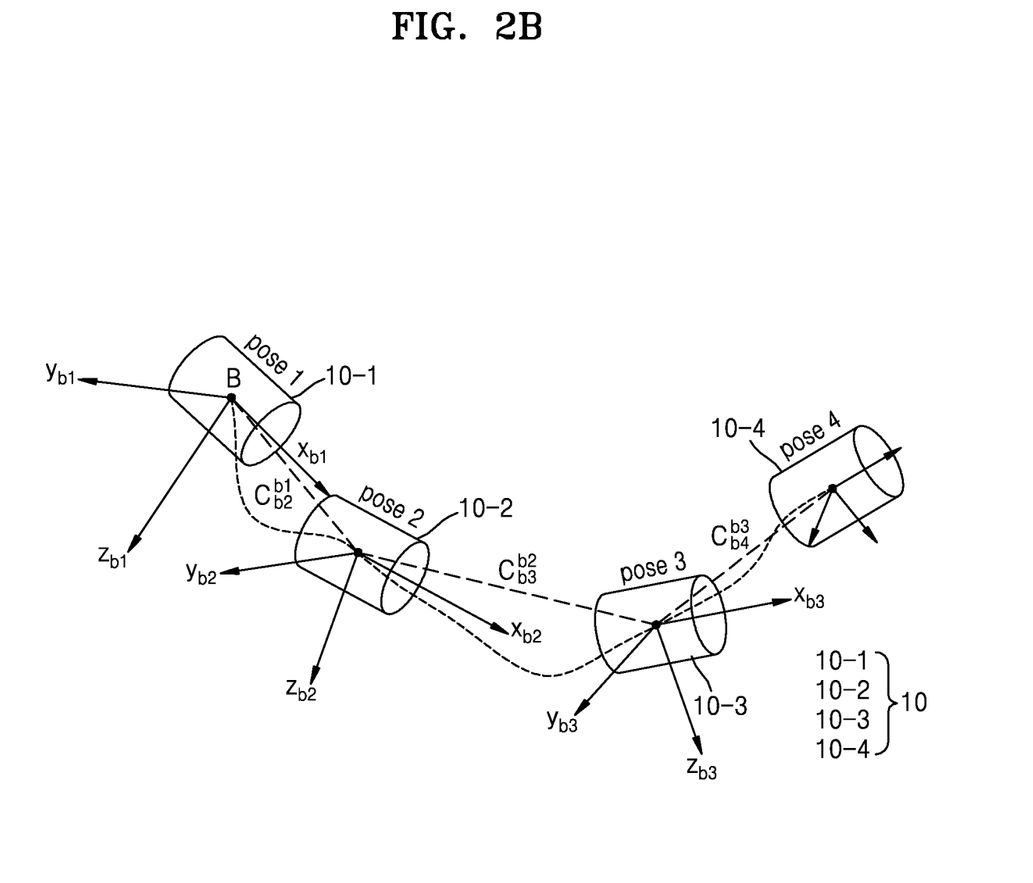

FIGS. 2A and 2B are views explaining a preintegration method according to a change in pose information about a moving body, according to an example embodiment.

Referring to FIG. 2A, a dotted line represents an orbit of a moving body 10 and a point at which inertia data has been obtained. Inertia data is transformed into a reference coordinate system as illustrated in a dotted line. Here, the reference coordinate system denotes a coordinate system used for informing a position of the moving body 10 in inertial navigation such as an earth coordinate system like a GPS, that is, a globally referenced navigation frame.

To obtain navigation information, the inertia data should be transformed into the reference coordinate system (Xn, Yn, Zn) as illustrated in the dotted line before integration. To compensate for a gravity portion having a non-linear influence on integration of the inertia data, estimation of an initial attitude is required. This application requires a method of obtaining an initialization procedure or an initial condition. That is, to obtain pose information about the moving body 10 by integrating the inertia data, an initial value of an initial attitude should be determined.

Specifically, in calculating pose information about the moving body 10 based on the inertia data, an inertial navigation algorithm which uses a simultaneous localization and mapping (SLAM) application using a detected value of a camera detecting movement of the moving body 10 from a reference coordinate system may be applied. This application may be used in a small area where the curvature of the earth is ignorable. In this case, integration of the inertia data may be simplified by Equations below.

$$p_{t2}{}^n = p_{t1}{}^n(t2-t1)v_{t1}{}^n + \int\!\int_{t1}{}^{t2}(C_{bt}{}^n(f_t{}^b - \text{bias}_f{}^{obs}) + g^n)dt^2 \quad (1)$$

$$v_{t2}{}^n = v_{t1}{}^n + \int_{t1}{}^{t2}(C_{bt}{}^n(f_t{}^b - \text{bias}_f{}^{obs}) + g^n)dt \quad (2)$$

$$\phi_{t2}{}^n = \phi_{t1}{}^n + \int_{t1}{}^{t2}E_{bt}{}^n(\omega_t{}^b - \text{bias}_\omega{}^{obs})dt \quad (3)$$

Here, $C_{bt}{}^n$ and $E_{bt}{}^n$ are matrixes for rotation and a rotation rate during rotation from a coordinate system of the moving body 10 to the preset coordinate system. Here, $P_{t2}{}^n$, $v_{t2}{}^n$, and $\phi_{t2}{}^n$ are a position, a velocity and an attitude of the moving body 10 calculated at t2 based on the reference coordinate system, and $P_{t1}{}^n$, $v_{t1}{}^n$, and $\phi_{t1}{}^n$ are a position, a velocity and an attitude of the moving body 10 calculated at t1, which denote initial values. $f_t{}^b$ is a value of a translational acceleration according to inertia data, and $\omega_t{}^b$ is a value of an angular velocity acceleration according to inertia data.

In a case of calculating pose information about the moving body 10 through Equations 1 to 3, after measured inertia data is transformed to the reference coordinate system, a value of the gravity of the earth is corrected every time, and then, integration of the inertia data may be performed. That is, to obtain pose information about the moving body 10, whenever an initial value changes, the inertia data should be reintegrated. As described above, a method of obtaining pose information about the moving body 10 from the inertia data requires a large amount of operations due to continuous reintegration, and requires a high performance controller.

In a case where the inertia data may be integrable in advance with an initial condition of the moving body 10 unknown, for example, an extended Kalman filter (EKF), etc. may deal with numerous inertia data as one inertia data and solve the above-described problem. Such a method is referred to as preintegration. The preintegration is described below with reference to FIG. 2B.

Referring to FIG. 2B, a dotted line represents an orbit of the moving body 10 and a point at which inertia data has been obtained. The inertia data are integrated based on a coordinate system of the moving body 10 in previous pose information about the moving body 10 as illustrated in the dotted line. Here, the coordinate system of the moving body 10 denotes a coordinate system set in advance to the moving body 10 itself. For example, in a case where the moving body 10 is an automobile, the coordinate system of the moving body 10 may set a progression direction to an x-axis, a side direction to a y-axis, and a direction facing sky to a z-axis. Meanwhile, the coordinate system of the moving body 10 at a specific point may be set through preset pose information about the moving body 10.

The preintegration integrates inertia data existing between pose information (between a first pose and a second pose, between the second pose and a third pose, and between the third pose and a fourth pose) required based on a coordinate system of the moving body 10 in a previous pose as illustrated in FIG. 2B. In applying navigation, pose information may be calculated in response to a detection speed of other sensors which is less than that of an inertia sensor. For example, a frame speed of a camera is considerably lower than a sensing speed of the inertia sensor. Therefore, a large amount of inertia data measured during a time interval in which the camera obtains motion information are accumulated, and the accumulated inertia data may be preintegrated and processed as one inertia value.

In this case, Equations 1 to 3 may be modified into Equations 4 to 6 below. These equations are used for a case of performing integration in a coordinate system of the last moving body 10. That is, pose information about a moving body 10-2 having second pose information may be calculated by performing integration based on a coordinate system of a moving body 10-1 having first pose information.

$$p_{t2}{}^n = p_{t1}{}^n + (t2-t1)v_{t1}{}^n + \int\!\int_{t1}{}^{t2}g^n dt^2 + C_{bt1}{}^n\int\!\int_{t1}{}^{t2}(C_{bt}{}^{bt1}(f_t{}^b - \text{bias}_f{}^{obs}))dt^2 \quad (4)$$

$$v_{t2}{}^n = v_{t1}{}^n + \int_{t1}{}^{t2}g^n dt + C_{bt1}{}^n\int_{t1}{}^{t2}(C_{bt}{}^{bt1}(f_t{}^b - \text{bias}_f{}^{obs}))dt \quad (5)$$

$$\phi_{t2}{}^n = \phi_{t1}{}^n + E_{bt1}{}^n\int_{t1}{}^{t2}E_{bt}{}^{bt1}(\omega_t{}^b - \text{bias}_\omega)dt \quad (6)$$

Here, $c_{bt}{}^{bt1}$ and $E_{bt}{}^{bt1}$ are matrixes for rotation and a rotation rate based on a coordinate system of the moving body 10 at t1, $f_t{}^b$ is a value of a translational acceleration according to inertia data, and $\omega_t{}^b$ is a value of an angular velocity according to inertia data. An initial condition for a rotation matrix $c_{bt}{}^{bt1}$ at t1 at which integration starts is $c_{bt1}{}^{bt1}$ which is a unit matrix. For example, as illustrated in FIG. 2B, when the moving body 10 moves from first pose information to second pose information (moves from a first position where the moving body 10 (10-1) has a pose 1 to a second position where the moving body 10 (10-2) has a pose 2), a rotation matrix is $c_{b2}{}^{b2}$, when the moving body 10 moves from the second pose information to third pose information (moves from the second position to a third position where the moving body 10 (10-3) has a pose 3), a rotation matrix is $c_{b3}{}^{b2}$, and when the moving body 10 moves from the third pose information to fourth pose information (moves from the third position to a fourth position where the moving body 10 (10-4) has a pose 4), a rotation matrix is $c_{b4}^{b3}$. In this manner, pose information about a current moving body 10 may be calculated based on a coordinate system of the previous moving body 10.

Meanwhile, the above equations may still provide pose information about the moving body 10 calculated based on the preset coordinate system. However, integration of inertia data between two poses (e.g. between a first pose (pose 1) and a second pose (pose 2)) may be performed based on a coordinate system of the moving body 10-1 having the first pose information, and the integration may be transformed into the reference coordinate system only after the integration is completed.

Equations 4 to 6 are integrations performed in the coordinate system of the moving body 10. A state of the moving body 10 may be known perfectly in the coordinate system of the moving body 10, and consequently, inertia data may be preintegrated even without an initial condition. When integrands of the inertia data in Equations 4 to 6 are extracted, Equations below may be obtained.

$$\Delta p_{t2}^{t+1} = \iint_{t1}^{t2} C_{bt}^{bt1}(f_t^b - \text{bias}_f^{obs}) dt^2 \quad (7)$$

$$\Delta v_{t2}^{t1} = \int_{t1}^{t2} C_{bt}^{bt1}(f_t^b - \text{bias}_f^{obs}) dt \quad (8)$$

$$\Delta \phi_{t2}^{t1} = \int_{t1}^{t2} E_{bt}^{bt1}(\omega_t^b - \text{bias}_\omega^{obs}) dt \quad (9)$$

Equations 7 to 9 are parts for a position change amount, a velocity change amount and an attitude change amount when the moving body 10 moves from the first pose information to the second pose information (from the pose 1 to the pose 2), and may be preintegrated without an initial condition. Meanwhile, the position change amount, the velocity change amount, and the attitude change amount are defined as preintegration amounts.

The preintegrated parts may be used as one change amount which substitutes for inertia data observed between the two poses. Once calculated, regarding terms for the change amounts, Equations 4 to 6 may be replaced with Equations 10 to 12. Since a gravity vector function part does not include a term depending on time, integration of a gravity term in this relation equation may be simplified.

$$p_{t2}^n = p_{t1}^n + (t2 - t1)v_{t1}^n + \frac{1}{2}(t2 - t1)^2 g^n + C_{bt1}^n \Delta p_{t2}^{t+1} \quad (10)$$

$$v_{t2}^n = v_{t1}^n + (t2 - t1)g^n + C_{bt1}^n \Delta v_{t2}^{t1} \quad (11)$$

$$\phi_{t2}^n = EulerFromDCM(C_{bt1}^n \Delta C_{bt2}^{bt1}) \quad (12)$$

In inertia-based navigation according to preintegration, pose information about the moving body 10 may be calculated fast without reintegration depending on change in an initial condition by preintegrating inertia data from a point at which previous pose information has been output to a point at which pose information about the current moving body 10 is to be requested.

Figure 3:
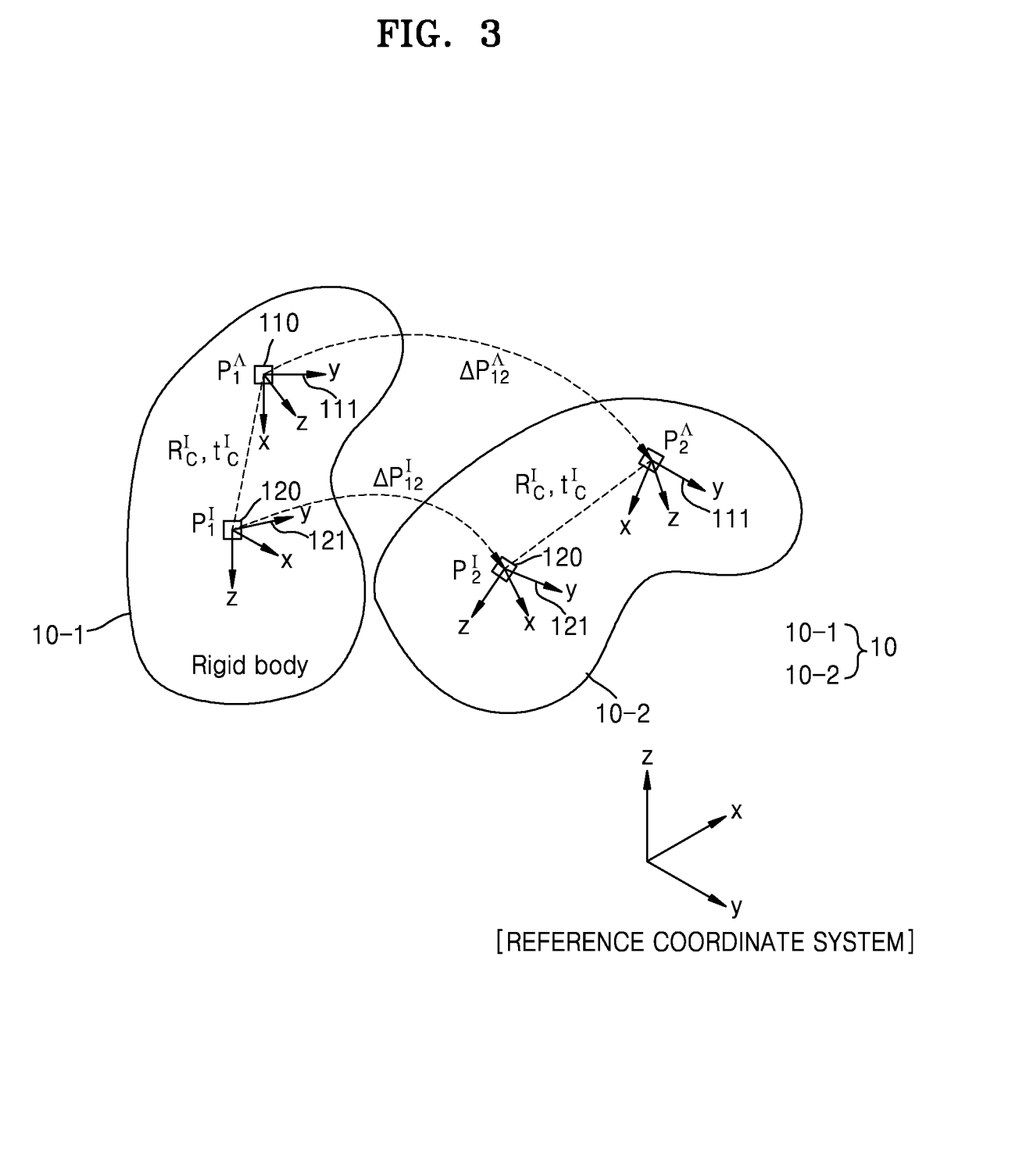
FIG. 3 is a view illustrating movement of a moving body to explain a relative preintegration method, according to an example embodiment.

FIG. 3 is a view illustrating a motion of a moving body to explain a relative preintegration method, according to an example embodiment.

Referring to FIG. 3, a moving body 10 having first pose information (10-1) moves to have second pose information (10-2). In this case, a first sensor 110 and a second sensor 120 have different position change amounts and velocity change amounts due to a relative coordinate system difference. However, since the first sensor 110 and the second sensor 120 are provided to the same rigid body, which is a portion of the moving body 10, and so rotation angles thereof are the same, the first and second sensor 110 and 120 have the same attitude change amount.

The first sensor 110 may be fixed to the moving body 10 to detect information about movement of the moving body 10. The first sensor 110 may be installed at a preset position of the moving body 10 to detect information about movement of the moving body 10 based on a first preset coordinate system. For example, the first sensor 110 may include a camera or a lidar which may detect information about movement of the moving body 10 by using visual information. The first sensor 110 may output motion information, which is information about movement of the moving body 10 detected based on the first coordinate system.

The second sensor 120 may be installed to the moving body 10 such that the second sensor 120 is spaced apart from the first sensor 110. The second sensor 120 may detect inertia information or data such as a translational acceleration and an angular acceleration depending on movement of the moving body 10 and output inertia data. For example, the second sensor 120 may include at least one of an accelerometer, an angular velocity meter and an altimeter, and detect inertia information or data about the moving body 10. As illustrated in FIG. 3, a second coordinate system is set in the second sensor 120 in advance, the second coordinate system being different from the first coordinate system of the first sensor 110. The second sensor 120 may detect and output the inertia data based on the second coordinate system.

Meanwhile, the first coordinate system of the first sensor 110 may be a coordinate system having a preset rotation displacement with respect to the reference coordinate system described with reference to FIG. 2. Likewise, the second coordinate system of the second sensor 120 may be a coordinate system having a preset rotation displacement with respect to the reference coordinate system, and may be a coordinate system having a preset rotation displacement with respect to the first coordinate system.

Meanwhile, an inertia sensor included in the second sensor 120 has a different detected inertia value depending on an arranged position thereof in the moving body 10. Therefore, inertia data detected at a position of the second sensor 120 has a value different from a value of inertia data detected at a position of the first sensor 110.

According to an example embodiment, the inertia-based navigation apparatus 100 illustrated in FIG. 1 may estimate a relative preintegration amount at a position of the first sensor 110 based on inertia data obtained from the second sensor 120 and a displacement difference (or a position difference between the first sensor 110 and the second sensor 120) between the first coordinate system and the second coordinate system. Specifically, Equations 7 to 9 described with reference to FIG. 2B may be modified into Equations below by reflecting the displacement difference.

$$\Delta \phi_{ij}^\Lambda = \Delta \phi_{ij}^I \quad (13)$$

$$\Delta v_{ij}^\Lambda = \Delta v_{ij}^I \Delta v_{ij}^R t_\Lambda^I \quad (14)$$

$$\Delta p_{ij}^\Lambda = \Delta p_{ij}^I \Delta p_{ij}^R t_\Lambda^I \quad (15)$$

Here, $\Delta \phi_{ij}^I$, $\Delta v_{ij}^I$, and $\Delta p_{ij}^I$ are preintegration amounts calculated by the preintegration method described with reference to FIG. 2B, and $t_\Lambda^I$ a position difference between the second sensor 120 and the first sensor 110 or a displacement difference value between the coordinate systems. For example, when the second sensor 120 is positioned at (0,0,1)

and the first sensor 110 is positioned at (2,0,1) in a coordinate system of x, y and z, $t_\Lambda^I$ may be set to (2,0,0).

$\Delta v_{ij}^R * t_\Lambda^I$ and $\Delta p_{ij}^R * t_\Lambda^I$ are relative difference amounts of a position change amount and a velocity change amount which change depending on a value of $t_\Lambda^I$. That is, $\Delta \phi_{ij}^\Lambda$, $\Delta v_{ij}^\Lambda$, and $\Delta p_{ij}^\Lambda$, which are relative integration amounts, may be estimated by reflecting $\Delta v_{ij}^R * t_\Lambda^I$ and $\Delta p_{ij}^R * t_\Lambda^I$ to Equations 7 to 9, the relative integration amounts being predicted by the first sensor 110 at a position having a preset displacement difference. That is, the relative preintegration amounts may be calculated by adding the difference amounts to the preintegration amounts. Meanwhile, $\Delta v_{ij}^R$ and $\Delta p_{ij}^R$ may be obtained by Equations below.

$$\Delta v_{ij}^R = \sum_{k=i}^{j-1} \Delta \phi_{ik}^I ([\alpha_k^I]_x + [\omega_k^I]_x^2) \Delta t \quad (16)$$

$$\Delta p_{ij}^R = \sum_{k=i}^{j-1} \left( \Delta v_{ik}^R \Delta t + \frac{1}{2} \Delta \phi_{ik}^I ([\alpha_k^I]_x + [\omega_k^I]_x^2) \Delta t^2 \right) \quad (17)$$

Here, $\alpha_k^I$ is an angular acceleration, $\omega_k^I$ is an angular velocity, and $[\cdot]_x$ is a skew symmetry matrix. Specifically, the inertia-based navigation apparatus 100 may calculate an angular acceleration and an angular velocity through inertia data, obtain $\Delta v_{ij}^R$ and $\Delta p_{ij}^R$ by reflecting the calculated angular acceleration and angular velocity to Equations 16 and 17, calculate the difference amount depending on a difference of $t_\Lambda^I$ by multiplying $\Delta v_{ij}^R$ and $\Delta p_{ij}^R$ by $t_\Lambda^I$, and calculate the relative preintegration amount predicted based on the first coordinate system by adding the difference amount to $\Delta \phi_{ij}^I$, $\Delta v_{ij}^I$, and $\Delta p_{ij}^I$, which are preintegration amounts calculated based on the second coordinate system according to the preintegration. Meanwhile, Equations 13 to 17 are relative preintegration equations newly defined by reflecting a relative dynamic aspect to the preintegration equations of a related art.

In other words, a position change amount and a velocity change amount which change depending on a position difference (that is, a displacement difference between the first coordinate system and the second coordinate system) between the first sensor 110 and the second sensor 120 may be considered by using Equations 13 and 17, and relative preintegration amounts, which are a position change amount and a velocity change amount, may be estimated based on inertia data detected by the second sensor 120 and the position difference, the position change amount and the velocity change amount being predicted at a position of the first sensor 110.

According to an example embodiment, the inertia-based navigation apparatus 100 may estimate second pose information predicted at a position of the first sensor 110 based on inertia data detected by the second sensor 120. The controller 130 may estimate the second pose information by using the relative preintegration amount reflecting the relative dynamic part. Specifically, the inertia-based navigation apparatus 100 may estimate the second pose information, which is relative pose information at the position of the first sensor 110 that is another sensor, through equations below reflecting Equations 13 to 17.

$$\phi_j^\Lambda = \phi_i^\Lambda R_I^\Lambda \phi_{ij}^I R_\Lambda^I \quad (18)$$

$$v_j^\Lambda = v_i^\Lambda + R_i^\Lambda g_0^I \Delta t_{ij} + \phi_i^\Lambda R_I^\Lambda \Delta v_{ij}^\Lambda \quad (19)$$

$$p_j^\Lambda = p_i^\Lambda + v_i^\Lambda \Delta t_{ij} + \frac{1}{2} R_i^\Lambda g_0^I \Delta t_{ij}^2 + \phi_i^\Lambda R_I^\Lambda \Delta p_{ij}^\Lambda \quad (20)$$

$\phi_j^\Lambda$, $v_j^\Lambda$, and $p_j^\Lambda$ are second pose information, which are a position, a velocity and an attitude of the moving body 10, estimated based on a coordinate system of the first sensor 110, which is another sensor, by using inertia data of the second sensor 120. Here, $R_I^\Lambda$ is a rotation displacement, which is a coordinate rotation value allowing x, y and z axes of the second coordinate system to coincide with x, y and z axes of the first coordinate system, and is an external correction value. $R_\Lambda^I$ forms a converse relation with $R_I^\Lambda$, and $g_0^I$ is an initial gravity value at the first sensor 110. That is, $\phi_j^\Lambda$, $v_j^\Lambda$, and $p_j^\Lambda$ may be estimated based on the estimated relative preintegration amount and the rotation displacement $R_I^\Lambda$. Meanwhile, $\phi_i^\Lambda$, $v_i^\Lambda$, and $p_i^\Lambda$ are values (e.g. initial values) which may be obtained from pose information about the moving body 10 determined right previously by the inertia-based navigation apparatus 100, j is 2, and i is 1 in FIG. 3.

Figure 4:
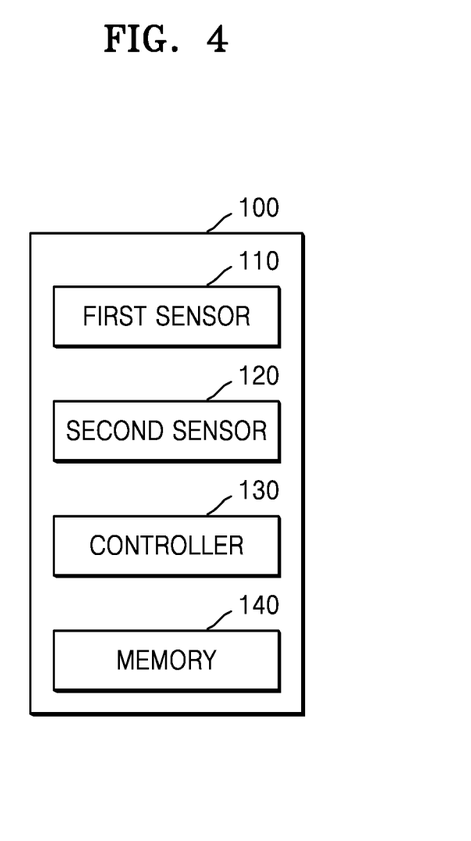
FIG. 4 is a view of an inner configuration of an inertia-based navigation apparatus, according to an example embodiment.

FIG. 4 is a view of an inner configuration of an inertia-based navigation apparatus, according to an example embodiment.

Referring to FIG. 4, the inertia-based navigation apparatus 100 includes the first sensor 110, the second sensor 120, a controller 130, and a memory 140.

The inertia-based navigation apparatus 100 may obtain inertia data and motion information from the second sensor 120 measuring inertia information or data depending on movement of the moving body 10, and the first sensor 110, which is another sensor, detecting movement of the moving body 10. The inertia-based navigation apparatus 100 may calculate pose information about a position, a velocity and an attitude of the moving body 10 based on the inertia data obtained from the second sensor 120, compare pose information corresponding to the motion information obtained from the first sensor 110 with the pose information calculated based on the inertia data to correct an error of the pose information calculated based on the inertia data.

Meanwhile, as illustrated in FIG. 2B, the inertia-based navigation apparatus 100 may calculate a rotation degree with respect to a coordinate system of the moving body 10 based on the previously determined coordinate system of the moving body 10, and preintegrate inertia data by using the calculated rotation degree. The coordinate system of the moving body 10 denotes a coordinate system set in advance to the moving body 10. For example, in a case where the moving body 10 is an automobile, the coordinate system of the moving body 10 may set a progression direction to an x-axis, a side direction to a y-axis, and a direction facing sky to a z-axis. For example, in a case where pose information about the moving body 10 is determined at a first time point, and then, pose information about the moving body is determined again at a second time point, the inertia-based navigation apparatus 100 may determine a coordinate system of the moving body at the first time point based on the pose information about the moving body 10-1 (see FIG. 2B) at the first time point, determine how much a coordinate system of the moving body 10-2 (see FIG. 2B) rotates from the determined coordinate system of the moving body 10-1 (see FIG. 2B), and perform preintegration.

The inertia-based navigation apparatus 100 may calculate the preintegration amount and the relative preintegration amount described with reference to FIG. 3 by using the preintegration method of preintegrating inertia data obtained from the inertia sensor, etc. between first pose information and second pose information based on how much the moving body 10 has rotated from the coordinate system of the previous moving body 10.

The controller 130 may calculate pose information about the moving body 10 at every first preset time based on motion information about the first sensor 110 and inertia data of the second sensor 120. Here, the first preset time may be set based on a sensor having a low detection speed among the first sensor 110 and the second sensor 120. For example, in a case where the first sensor 110 is a camera and detects movement of the moving body 10 twice per second, and the second sensor 120 is the inertia sensor and detects movement of the moving body 10 two hundred times per second, the first time may be set to 0.5 second or 1 second based on the detection speed of the first sensor 110. That is, the first preset time may be set to a value equal to or greater than the detection speed of the sensor having a low detection speed among the first sensor 110 and the second sensor 120.

The controller 130 may include all kinds of units which may process data such as a processor. Here, a 'processor' may denote, for example, a data processing unit built in a hardware and having a physically structuralized circuit in order to perform a function expressed by codes or commands included in a program. Though examples of the data processing unit built in a hardware may include processing units such as microprocessors, central processing units (CPUs), processor cores, multiprocessors, application-specific integrated circuits (ASICs), and field programmable gate arrays (FPGAs), the embodiment is not limited thereto.

Meanwhile, the controller 130 may include a single processor or a plurality of processors divided on a functional basis performed by the controller 130. For example, the controller 130 may include one processor and/or operator, calculate first pose information depending on motion information about the first sensor 110, estimate a relative preintegration amount by preintegrating inertia data of the second sensor 120, estimate second pose information based on the calculated relative preintegration amount, correct an error of the second pose information by comparing the second pose information with the first pose information, and determine current pose information about the moving body 10. Unlike this, the controller 130 may include a first pose information calculator calculating the first pose information depending on the motion information, a preintegration amount estimator estimating the relative preintegration amount by preintegrating the inertia data, a second pose information calculator calculating the second pose information based on the relative preintegration amount, an error corrector correcting an error of the second pose information by comparing the second pose information with the first pose information, and a pose information determination unit determining the error-corrected second pose information as pose information about the moving body 10.

According to an example embodiment, at least one of the first pose information calculator, the preintegration amount estimator, the second pose information calculator, the error corrector, and the pose information determination unit may be may be embodied as various numbers of hardware, software and/or firmware structures that execute respective functions described above. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a separate processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, communication between the components, elements, modules or units may be performed through a bus. Functional aspects of the above example embodiments may be implemented in algorithms that execute on one or more processors. Furthermore, these components, elements, modules or units may employ any number of related art techniques for electronics configuration, signal processing and/or control, data processing and the like The memory 140 stores temporarily or permanently data, instructions, programs, program codes, or a combination thereof, etc. processed by the controller 130. Though the memory 140 may include magnetic storage media or flash storage media, the embodiment is not limited thereto. The memory 140 may store temporarily or permanently motion information and inertia data detected by the first sensor 110 and the second sensor 120 in addition to data and commands processed by the controller 130.

The controller 130 according to an example embodiment may calculate first pose information, which is pose information about the moving body 10, based on motion information about the first sensor 110. For example, the first sensor 110 may include a camera, and the controller 130 may estimate a position, a velocity and an attitude of the moving body 10 by comparing a first image and a second image sequentially captured by the camera. Specifically, the controller 130 may estimate a position, a velocity and an attitude of the moving body 10 in the reference coordinate system with consideration of how much a pixel corresponding to a specific pixel of the first image moves in the second image, a change amount of depth information about the specific pixel, a time difference between the first image and the second image, etc.

According to an example embodiment, the controller 130 may set in advance an external correction value, which is a relation between a first coordinate system and a second coordinate system. As described with reference to FIG. 3, the external correction value is a value for a displacement difference between the first coordinate system and the second coordinate system and a value for a rotation displacement difference between the first coordinate system and the second coordinate system. The controller 130 may calculate a relative preintegration amount, which is a preintegration amount predicted at a position of the first sensor 110, by preintegrating inertia data measured by the second sensor 120 based on the displacement difference, which is the external correction value. The controller 130 may calculate second pose information estimated at a position of the first sensor 110 based on the rotation displacement difference, which is the external correction value, and the relative preintegration amount.

According to an example embodiment, the controller 130 may estimate the relative preintegration amount predicted at a position of the first sensor 110 according to preintegration based on the displacement difference and the inertia data obtained from the second sensor 120. As described with reference to FIG. 3, the controller 130 may calculate the preintegration amount by preintegrating the inertia data through Equations 7 to 9, and calculate the difference amount based on Equations 16 and 17 and the displacement difference between the first coordinate system and the second coordinate system. The controller 130 may calculate the relative preintegration amount by adding the preintegration amount and the difference amount.

Meanwhile, since the controller 130 determines pose information about the moving body 10 at every first time, the controller 130 calculates the preintegration amount by preintegrating inertia data detected during the first time, which is duration until pose information about the moving body 10 is determined again after pose information about the moving body 10 is determined. Also, the controller 130 may estimate the relative preintegration amount by calculating an angular acceleration and an angular velocity from the inertia data during the first time, estimating the difference amount corresponding to the position difference by reflecting the calculated angular acceleration and angular velocity to Equations 16 and 17, and adding the estimated difference amount to the preintegration amount. Meanwhile, since the controller 130 integrates inertia data according to the preintegration described with reference to FIG. 2B, the controller 130 may calculate the relative preintegration amount from the inertia data through preintegration reflecting a rotation degree of the moving body 10 which moves based on a right previously determined coordinate system of the moving body 10.

As described above, the external correction value, which is a relation between the first coordinate system and the second coordinate system, is set in advance, and the controller 130 may estimate second pose information reflecting relative dynamics by using the external correction value. The second pose information may be estimated by using Equations 18 to 20 described with reference to FIG. 3. Here, the external correction values denote a value of a displacement $t_A^I$ and a value of a rotational displacement $R_I^A$ between the first coordinate system and the second coordinate system. For example, in an x, y, z-coordinate system, when an inertial measurement unit is positioned at (0, 0, 1), and another sensor is positioned at (2, 0, 1), a difference value of a displacement may be set to (2, 0, 0). A rotational displacement denotes a rotational degree allowing x, y and z-axes of the first coordinate system to coincide with x, y and z-axes of the second coordinate system. Meanwhile, at a point reflecting the relative preintegration amount and the rotational amount in which the estimated second pose information may be predicted in the first coordinate system, the first pose information and the second pose information have information about a position, a velocity and an attitude of the moving body 10 corresponding to each other, and only differ in an error value depending on an error of the sensors.

Meanwhile, the external correction value may be set in advance with consideration of a spaced distance between the first sensor 110 and the second sensor 120, and a coordinate axis of each sensor, or the controller 130 may set the external correction value by using a method described below with reference to FIG. 6. The method of directly calculating and setting the external correction value is described with reference to FIG. 6.

Generally, an inertial navigation apparatus (not shown) using preintegration may be used together with another sensor in order to calculate pose information about the moving body. In this case, the other sensor and the inertia sensor use different coordinate systems, respectively. For example, when correcting an error of pose information about the moving body 10 calculated from the inertia sensor by using pose information about the moving body 10 calculated from the other sensor, the pose information about the moving body 10 calculated from the other sensor is transformed to a coordinate system of the inertia sensor and limits movement of the moving body 10 to movement of the moving body 10 in the coordinate system of the inertia sensor, and also a process of transforming values thereof to a coordinate system of a camera is required. This coordinate transformation increases an operation amount of the inertial navigation apparatus, and may considerably delay determination of pose information about the moving body 10. This coordinate transformation requires a coordinate transformation process between two sensors also in the inertial navigation apparatus which uses preintegration.

Unlike this, the inertia-based navigation apparatus 100 according to the above example embodiments estimates pose information predicted at a position of the first sensor 110, which is another sensor, based on inertia data and an external correction value. In this case, the controller 130 may immediately compare the first pose information with the second pose information without coordinate transformation, swiftly correct an error of the second pose information, and swiftly provide the error-corrected second pose information as pose information about the moving body 10. That is, since the controller 130 may estimate the second pose information which may be predicted in the first coordinate system based on a relative preintegration amount estimated based on the inertia data, and the external correction value, the controller 130 may correct an error of the second pose information by directly comparing the second pose information with the first pose information without coordinate transformation. Meanwhile, for the method of correcting an error of the second pose information by comparing the second pose information with the first pose information, a modified weighted least squares (mWLS) or a non-linear regression method, etc. may be used. The inventive concept is not limited thereto.

Figure 5:
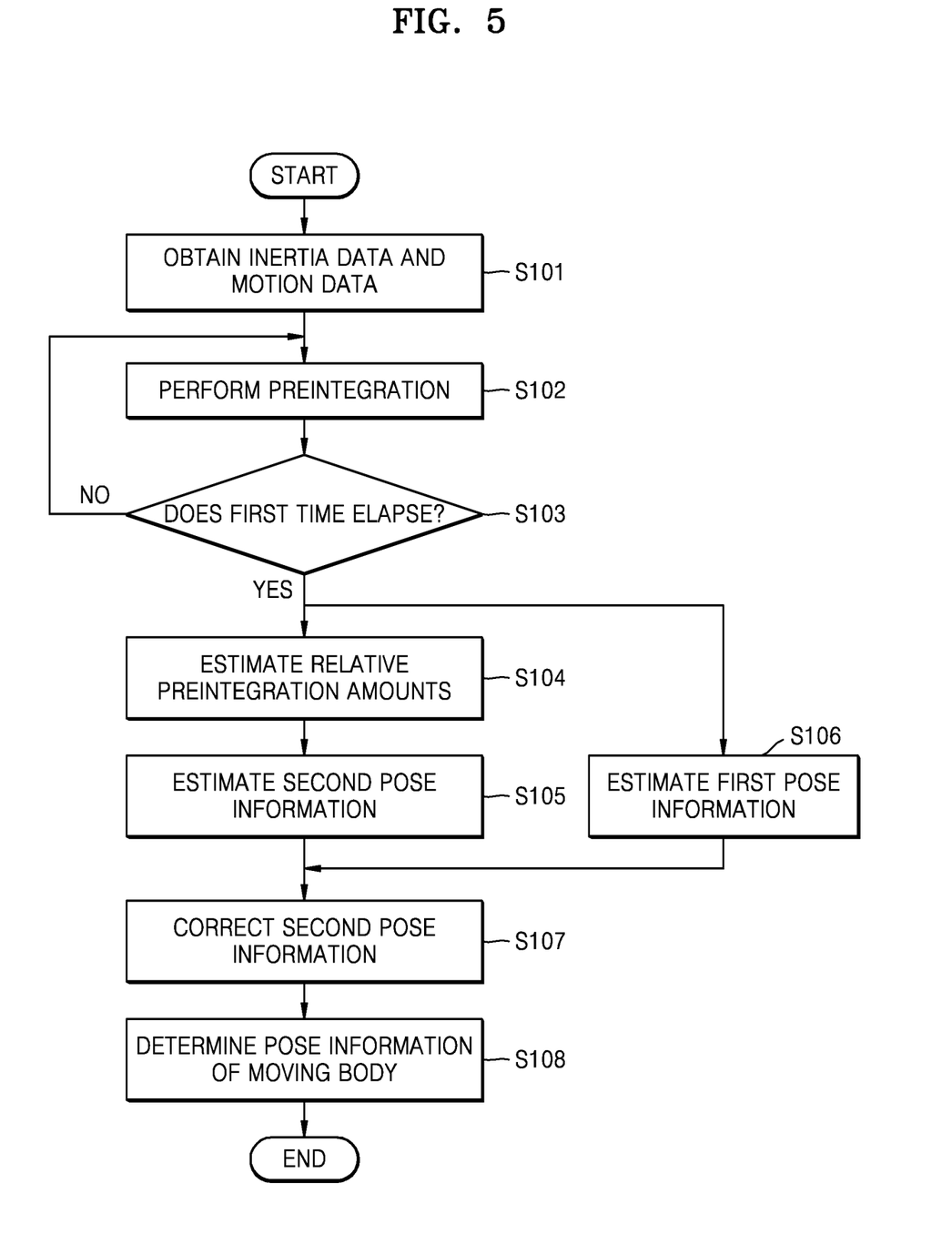
FIG. 5 is a flowchart for explaining an inertia-based navigation method based on relative preintegration, according to an example embodiment.

FIG. 5 is a flowchart for explaining an inertia-based navigation method based on relative preintegration, according to an example embodiment.

The flowchart illustrated in FIG. 5 includes operations which are processed in time series in the inertia-based navigation apparatus 100 illustrated in FIG. 4. Therefore, the above descriptions, though omitted below, in reference to FIG. 4 are applied to the flowchart illustrated in FIG. 5.

Referring to FIG. 5, the inertia-based navigation apparatus 100 may obtain motion information and/or inertia data from the first sensor 110 obtaining the motion information by detecting movement of the moving body 10, and the second sensor 120 obtaining the inertia information about the moving body 10. Meanwhile, a detection rate (a detection speed) of the first sensor 110 has a value less than a detection rate of the second sensor 120. For example, the first sensor 110 may detect movement of the moving body 10 illustrated in FIG. 1 at a rate of 10 times per second, and the second sensor 120 may detect movement of the moving body 10 illustrated in FIG. 1 at a rate of 100 times per second. In this case, the inertia-based navigation apparatus 100 may obtain inertia data a plurality of times whenever motion information is obtained one time.

The inertia-based navigation apparatus 100 may preintegrate the inertia data regardless of an initial value as described with reference to FIG. 2B. The inertia-based navigation apparatus 100 may preintegrate the inertia data through Equations 7 to 9 described with reference to FIG. 3 with consideration of a rotation degree based on a previously determined coordinate system of the moving body 10. Also, the inertia-based navigation apparatus 100 may calculate a difference amount by using Equations 17 and 18 described with reference to FIG. 3 and a displacement.

The inertia-based navigation apparatus 100 may determine pose information about the moving body 10 at every first time described with reference to FIG. 4, and continuously preintegrate inertia data detected during the first time from a point at which pose information has been determined right previously.

When the first time elapses, the inertia-based navigation apparatus 100 may calculate a relative preintegration amount based on the preintegration amount, which is a result value obtained by preintegrating inertia data for the first time, and the difference amount. Here, the relative preintegration amount reflects the relative dynamic portion depending on a displacement difference between the first coordinate system and the second coordinate system as described with reference to FIG. 4. That is, the estimated relative preintegration amount includes information about a position change amount and a velocity change amount of the moving body 10 reflecting a relative difference which may be predicted on an assumption that the second sensor 120 is positioned at the first sensor 110.

The inertia-based navigation apparatus 100 may calculate first pose information based on motion information, which is movement information detected in the first coordinate system, the first pose information being information about a position, a velocity and an attitude of the moving body 10 based on a reference coordinate system described with reference to FIG. 1.

The inertia-based navigation apparatus 100 may estimate second pose information from the relative preintegration amount by reflecting a rotation displacement, which is the external correction value described with reference to FIG. 4. Here, the second pose information is pose information which may be estimated at a position of the first sensor 110, which is another sensor, based on the inertia data detected by the second sensor 120 and the external correction value. The second pose information may be estimated by using Equations 18 to 20 described with reference to FIG. 4.

The inertia-based navigation apparatus 100 may correct an error of the second pose information by comparing the calculated first pose information with the estimated second pose information. Specifically, the second pose information includes an error by a bias value and noises, etc. The first pose information includes an error by a bias value and noises, etc. The inertia-based navigation apparatus 100 may calculate a value which may minimize an error of the first pose information and the second pose information by comparing the first pose information with the second pose information, and correct the second pose information such that an error of the second pose information is minimized based on the calculated value.

The inertia-based navigation apparatus 100 may determine the corrected second pose information as pose information about the moving body 10.

Figure 6:
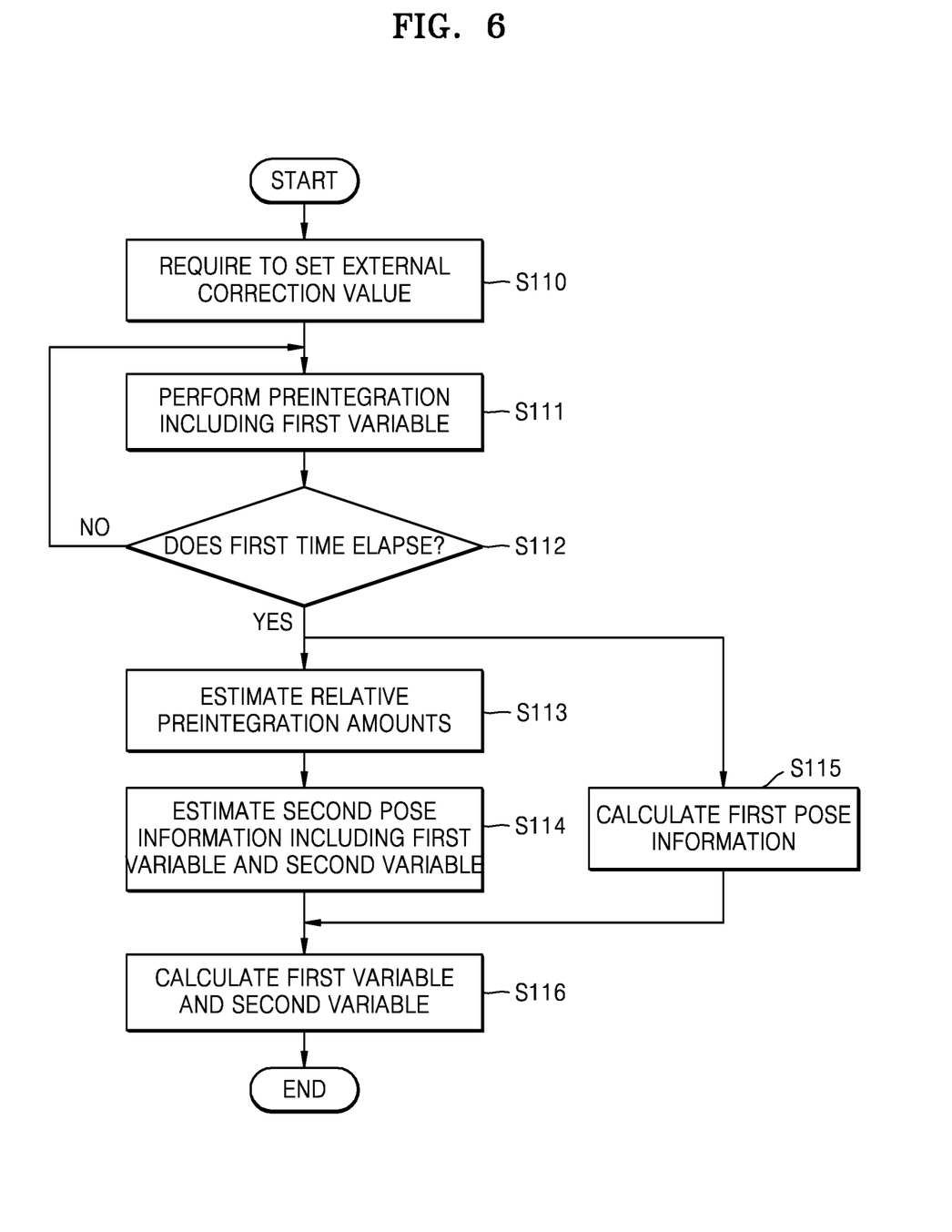
FIG. 6 is a flowchart for explaining a method of determining an external correction value in an inertia-based navigation method based on relative preintegration, according to an example embodiment.

FIG. 6 is a flowchart for explaining a method of determining an external correction value in an inertia-based navigation method based on relative preintegration, according to an example embodiment.

The flowchart illustrated in FIG. 6 includes operations which are processed in time series in the inertia-based navigation apparatus 100 illustrated in FIG. 4. Therefore, the above descriptions, though omitted below, in reference to FIG. 4 is applied to the flowchart illustrated in FIG. 6.

Referring to FIG. 6, in a case where an external correction value is not set in advance or a preset condition is satisfied, the inertia-based navigation apparatus 100 may require setting of the external correction value. The preset condition is a case where a physical impact is accumulated to the moving body 10 and so a time required to change a preset external correction value elapses, or a case where resetting of the external correction value is requested by a user.

The inertia-based navigation apparatus 100 calculates the preintegration value and the difference amount described with reference to FIG. 3, and the difference amount includes $t_A^I$, which is a first variable, as an undetermined variable. That is, the inertia-based navigation apparatus 100 may perform preintegration based on Equations 13 to 15 with the first variable.

The inertia-based navigation apparatus 100 may estimate a relative preintegration amount depending on the preintegration based on inertia data until the first time described with reference to FIG. 4 elapses. In this case, the relative preintegration amount includes the first variable.

The inertia-based navigation apparatus 100 may calculate first pose information based on the reference coordinate described with reference to FIG. 2A based on motion information obtained from the first sensor 110.

The inertia-based navigation apparatus 100 may estimate $\phi_j^A$, $v_j^A$, and $p_j^A$, which are second pose information corresponding to Equations 18 to 20 described with reference to FIG. 3, by using the relative preintegration amount including the first variable, and $R_j^A$, which is a second variable described with reference to FIG. 3, as a variable. In this case, the second pose information includes the first variable and the second variable.

The inertia-based navigation apparatus 100 may obtain values of $\phi_j^A$, $v_j^A$, and $p_j^A$ in the second pose information including the first variable and the second variable through the calculated first pose information. The inertia-based navigation apparatus 100 may calculate the first variable and the second variable by inputting the values of $\phi_j^A$, $v_j^A$, and $p_j^A$ obtained through the first pose information into Equations 18 to 20.

The inertia-based navigation apparatus 100 may set the determined first and second variables to new external correction values, and after the setting is completed, the inertia-based navigation apparatus 100 may calculate pose information about the moving body 10 by using the newly set external correction values.

Therefore, the inertia-based navigation apparatus 100 preintegrates detected inertia data by using a preintegration method, and may estimate pose information about the moving body 10 based on a coordinate system of another sensor by calculating a relative preintegration amount reflecting relative dynamics. Through this, the inertia-based navigation apparatus 100 may correct an error of pose information about the moving body 10 estimated based on the inertia data by swiftly comparing the pose information about the moving body 10 with pose information about the moving body 10 based on motion information detected by the other sensor without coordinate transformation. Also, even in a case where an external correction value is not set or resetting of the external value is required, the inertia-based navigation apparatus 100 may swiftly find out and set the external correction value.

The above-described example embodiments may be embodied in the form of computer programs executable through various components on a computer, and the computer program may be recorded on a non-transitory computer-readable recording medium. In this case, examples of the non-transitory computer-readable recording medium include magnetic recording media such as hard disks, floppy disks, and magnetic tapes, optical recording media such as compact disc read-only memories (CD-ROMs) and digital versatile disks (DVDs), magneto-optical recording media such as floptical disks, and hardware devices such as ROMs, random access memories (RAMs), and flash memories that are especially configured to store and execute program commands. Furthermore, the non-transitory computer-readable recording medium may include an intangible medium embodied in a transmittable form on a network, and may be, for example, a medium embodied in the form of software or an application and transmittable and distributable via a network.

Meanwhile, the computer programs may be those that are especially designed and configured for the inventive concept, or may be those that are known and available to computer programmers skilled in the art. Examples of the computer programs include machine language codes that may be generated by a compiler, and high-level language codes that may be executed by a computer by using an interpreter.

The particular implementations shown and described herein are illustrative examples of the inventive concept and are not intended to otherwise limit the scope of the inventive concept in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the inventive concept unless the element is specifically described as "essential" or "critical."

Therefore, the spirit of the inventive concept should not be limited to the above embodiments, and all scopes of not only appended claims but also equivalents thereof or equivalent modifications thereof fall within the spirit of the inventive concept.

What is claimed is:

1. An inertia-based navigation apparatus comprising:
    a first sensor configured to detect and output motion information about a moving body which is moving from a first position to a second position, based on a first coordinate system;
    a second sensor configured to detect and output inertia data about a translational acceleration and a rotational angular velocity related to the movement of the moving body which is moving from the first position to the second position, based on a second coordinate system; and
    a controller configured to determine pose information about a position, a velocity and an attitude of the moving body in a reference coordinate system at the second position, based on the motion information and the inertia data,
    wherein the controller is further configured to:
        calculate first pose information at the second position about the moving body, based on the motion information obtained by the first sensor;
        determine a rotation degree at the second position of the moving body which is moving based on a coordinate system of the moving body according to pose information of the moving body determined at the first position;
        calculate preintegration amounts, which comprise a position change amount, a velocity change amount and an attitude change amount in the second coordinate system, by preintegrating the inertia data from the first position to the second position based on the determined rotation degree;
        estimate relative preintegration amounts, which comprise a position change amount, a velocity change amount and an attitude change amount of the moving body predicted in the first coordinate system, based on the preintegration amounts and an external correction value which is a preset relation between the first coordinate system and the second coordinate system;
        calculate, based on the relative preintegration amounts and the external correction value, second pose information at the second position about the moving body corresponding to the inertia data obtained by the second sensor;
        correct an error of the second pose information by comparing the first pose information with the second pose information; and
        determine the error-corrected second pose information as pose information about the moving body at the second position.

2. The apparatus of claim 1, wherein the external correction value comprises a displacement difference between the first coordinate system and the second coordinate system and a rotational displacement difference between the first coordinate system and the second coordinate system.

3. The apparatus of claim 2, wherein the controller is further configured to calculate, based on the inertia data, an angular acceleration and an angular velocity, calculate a difference amount between the preintegration amounts and the relative preintegration amounts predicted in the first coordinate system, based on the calculated angular acceleration and the calculated angular velocity, and estimate the relative preintegration amounts based on the preintegration amounts and the difference amount.

4. The apparatus of claim 3, wherein the controller is further configured to calculate the relative preintegration amounts based on the displacement difference between the first coordinate system and the second coordinate system and calculate the second pose information based on the rotational displacement difference between the first coordinate system and the second coordinate system.

5. The apparatus of claim 2, wherein the controller is further configured to estimate the relative preintegration amounts by incorporating a first variable which corresponds to the displacement difference between the first coordinate system and the second coordinate system, and calculate the second pose information by incorporating a second variable which corresponds to the rotational displacement difference between the first coordinate system and the second coordinate system.

6. The apparatus of claim 5, wherein the controller is further configured to set the external correction value by comparing the first pose information with the second pose information, and determine values of the first variable and the second variable.

7. The apparatus of claim 6, wherein the controller is further configured to calculate the second pose information based on the determined values of the first and second variables.

8. The apparatus of claim 1, wherein the first sensor detects the movement of the moving body by using at least one of a camera and a lidar.

9. The apparatus of claim 1, wherein a detection rate of the first sensor to detect the movement of the moving body in a unit time is less than the detection rate of the second sensor.

10. The apparatus of claim 1, wherein the first sensor and the second sensor are disposed in the moving body, and
wherein the controller estimates the relative preintegration amounts based on the second sensor being positioned at a position of the first sensor.

11. An inertia-based navigation method, the method comprising:
obtaining motion information from a first sensor detecting movement of a moving body which is moving from a first position to a second position based on a first coordinate system;
obtaining inertia data from a second sensor detecting a translational acceleration and a rotational angular velocity which are measured according to the movement of the moving body which is moving from the first position to the second position based on a second coordinate system; and
determining pose information about a position, a velocity and an attitude of the moving body in a reference coordinate system at the second position, based on the motion information and the inertia data,
wherein the determining the pose information further comprises:
calculating first pose information at the second position about the moving body, based on the motion information obtained by the first sensor;
determining a rotation degree at the second position of the moving body which is moving based on a coordinate system of the moving body according to pose information of the moving body determined at the first position;
calculating preintegration amounts, which comprise a position change amount, a velocity change amount and an attitude change amount in the second coordinate system, by preintegrating the inertia data from the first position to the second position based on the determined rotation degree;
estimating relative preintegration amounts, which comprise a position change amount, a velocity change amount and an attitude change amount of the moving body predicted in the first coordinate system based on the preintegration amounts and an external correction value which is a relation between the first coordinate system and the second coordinate system;
calculating, based on the relative preintegration amounts and the external correction value, second pose information at the second position about the moving body corresponding to the inertia data obtained by the second sensor;
correcting an error of the second pose information by comparing the first pose information with the second pose information; and
determining the error-corrected second pose information as pose information about the moving body at the second position.

12. The method of claim 11, wherein the external correction value comprises a displacement difference between the first coordinate system and the second coordinate system and a rotational displacement difference between the first coordinate system and the second coordinate system.

13. The method of claim 12, wherein the estimating the relative preintegration amounts further comprises:
calculating an angular acceleration and an angular velocity, based on the inertia data;
calculating a difference amount between the preintegration amounts and the relative preintegration amounts predicted in the first coordinate system based on the calculated angular acceleration and the calculated angular velocity; and
estimating the relative preintegration amounts based on the first preintegration amounts and the difference amount.

14. The method of claim 13, wherein the estimating the relative preintegration amounts further comprises estimating the relative preintegration amounts based on the displacement difference between the first coordinate system and the second coordinate system, and
wherein the calculating the second pose information further comprises calculating the second pose information based on the rotation displacement difference between the first coordinate system and the second coordinate system.

15. The method of claim 12, wherein the estimating the relative preintegration amounts further comprises estimating the relative preintegration amounts by incorporating a first variable which corresponds to the displacement difference between the first coordinate system and the second coordinate system, and
wherein the calculating the second pose information further comprises calculating the second pose information by incorporating a second variable which corresponds to the rotational displacement difference between the first coordinate system and the second coordinate system.

16. The method of claim 15, further comprising determining values of the first and second variables and setting the external correction value by comparing the first pose information with the second pose information.

17. The method of claim 16, wherein the calculating the second pose information further comprises calculating the second pose information based on the determined values of the first and second variables.

18. The method of claim 11, wherein a detection rate of the first sensor to detect the movement of the moving body in a unit time is less than the detection rate of the second sensor.

* * * * *